(12) United States Patent
Behrends

(10) Patent No.: US 7,899,629 B2
(45) Date of Patent: Mar. 1, 2011

(54) METHOD FOR DETERMINING THE TOTAL LEAK RATE OF SYSTEMS IMPINGED UPON BY PRESSURE, AND CONTROL APPARATUS FOR CARRYING OUT SAID METHOD

(75) Inventor: Peter Behrends, Bobbau (DE)

(73) Assignee: Testo AG, Lenzkirch (DE)

( * ) Notice: Subject to any disclaimer, the term of this patent is extended or adjusted under 35 U.S.C. 154(b) by 30 days.

(21) Appl. No.: 11/921,704

(22) PCT Filed: Jun. 6, 2006

(86) PCT No.: PCT/EP2006/005381

§ 371 (c)(1),
(2), (4) Date: May 26, 2009

(87) PCT Pub. No.: WO2006/131312

PCT Pub. Date: Dec. 14, 2006

(65) Prior Publication Data

US 2009/0299659 A1    Dec. 3, 2009

(30) Foreign Application Priority Data

Jun. 10, 2005 (DE) .................. 10 2005 026 777

(51) Int. Cl.
*G01F 23/00* (2006.01)
*G01M 3/04* (2006.01)
(52) U.S. Cl. .............. 702/51; 73/49.2; 137/561 R
(58) Field of Classification Search .............. 702/51, 702/98, 138; 73/49.2; 137/561 R
See application file for complete search history.

(56) References Cited

U.S. PATENT DOCUMENTS

| | | | |
|---|---|---|---|
| 2,924,965 A | 2/1960 | Westerheim | |
| 4,430,891 A | 2/1984 | Holm | |
| 4,587,619 A * | 5/1986 | Converse et al. | 702/51 |
| 5,367,797 A | 11/1994 | Zaim | |
| 6,116,082 A | 9/2000 | Pride | |
| 6,182,501 B1 | 2/2001 | Furuse et al. | |
| 6,298,712 B1 | 10/2001 | Docy et al. | |
| 2002/0100314 A1 | 8/2002 | Docy et al. | |
| 2005/0034710 A1* | 2/2005 | Crary et al. | 123/457 |

FOREIGN PATENT DOCUMENTS

| | | |
|---|---|---|
| DE | 3925067 | 2/1991 |
| DE | 19942185 | 3/2001 |
| DE | 10242491 | 5/2003 |
| DE | 10258017 | 6/2004 |
| WO | WO 98/25122 | 6/1998 |

* cited by examiner

*Primary Examiner* — Bryan Bui
(74) *Attorney, Agent, or Firm* — Muirhead and Saturnelli, LLC

(57) ABSTRACT

A method for determining the total leak rate of a system impinged upon by pressure and connected to a control apparatus comprising a valve battery with a test side and a reference side, the valve battery being controllable via a measuring unit, encompasses the following steps: filling the system and the control apparatus with a test medium; closing the connection between the system and the control apparatus; opening a reference leak is on the valve battery; determining the reference leak rate; opening the connection between the system and the control apparatus; and determining the influence of the system on the reference leak rate. A control apparatus comprises a valve battery that is controlled by a measuring unit and is provided with a test side and a reference side which are separated with the aid of a differential pressure sensor and a test and check valve which is connected thereto.

71 Claims, 7 Drawing Sheets

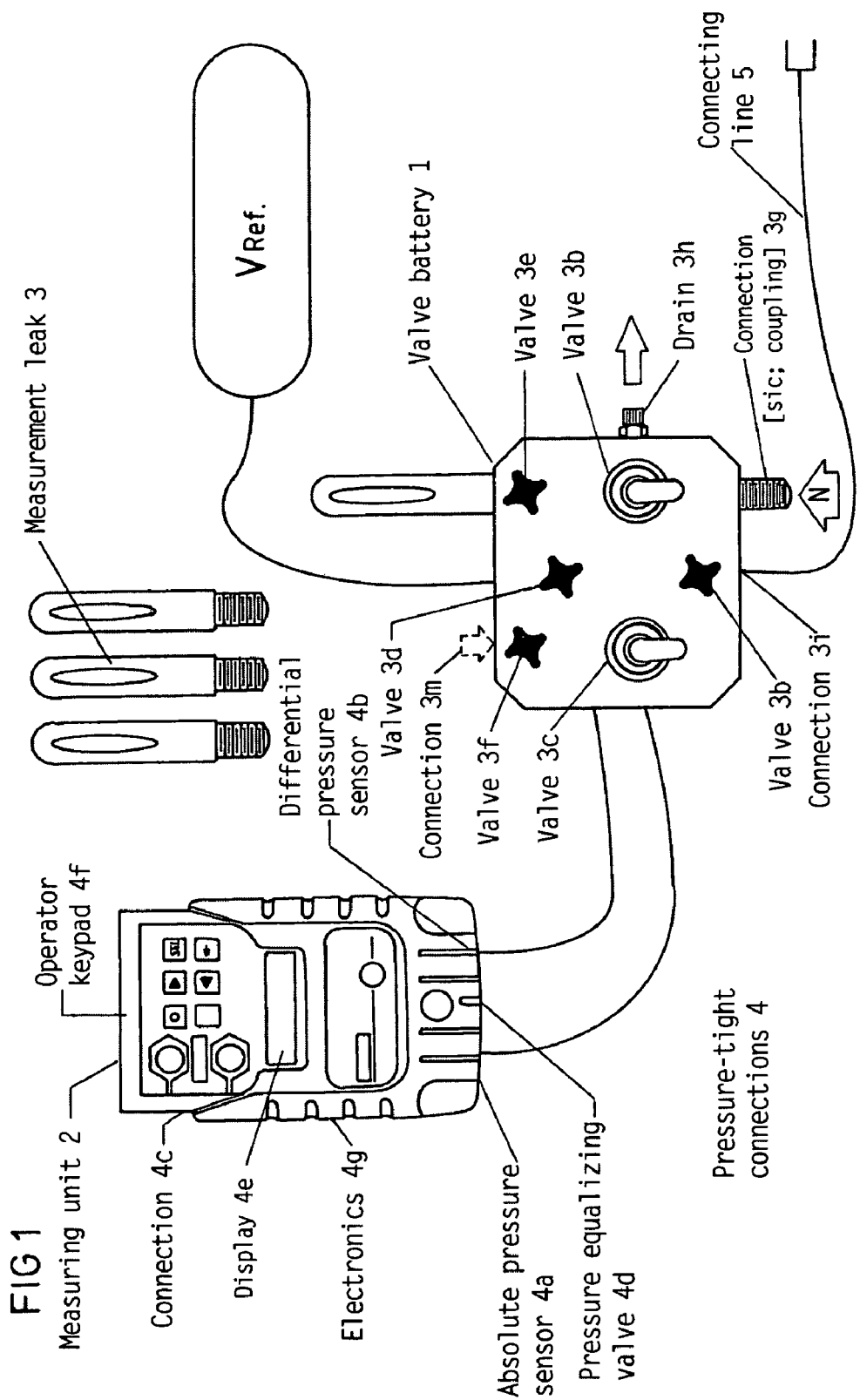

ns having large volumes of several dm³.
METHOD FOR DETERMINING THE TOTAL LEAK RATE OF SYSTEMS IMPINGED UPON BY PRESSURE, AND CONTROL APPARATUS FOR CARRYING OUT SAID METHOD

TECHNICAL FIELD

This application relates to a method for determining the total leak rate of systems to be pressurized, and a control apparatus for implementing this method.

BACKGROUND OF THE INVENTION

In many areas of technology, e.g., in refrigeration technology, the individual leaks expected in the system during operation must be localized and quantified, if necessary, and the total leak rate of the system must also be determined.

Methods for determining a total leak rate based on a pressure drop or pressure increase test are known. The system to be tested is filled up to the setpoint pressure and is checked for a change in pressure after a time period.

However, the known pressure drop tests for determining the total leak rate are subject to substantial inaccuracies. First, these tests are based on the pressure measurement technology used, which generally allows a resolution of only 10,000 Pa. Even in the case of small internal system volumes, the testing required, taking into account the maximum allowed leak rates, would take several days, depending on the test pressure, because only then would it be possible to determine whether there has actually been a change in pressure. Such long measurement times have the disadvantage that temperature changes not taken into account will greatly distort the measuring results. In the case of large internal volumes of several dm³ and only small total leak rates, such a measurement is no longer feasible at all.

However, even an increase in resolution to 5 Pa, for example, would still require a measurement time of several minutes. Even with such short measurement times, however, changes in temperature in the system to be tested occur, resulting in inaccuracies in the measuring result.

Another disadvantage of the known pressure drop test is that the internal volume of the system is not known at all or not known with sufficient accuracy. However, since the volume of the system has a linear influence on the leak rate, this results in further inaccuracies in the measured result. At the same time, wrong conclusions are drawn with regard to the test time required and thus another source of error is introduced because of this lack of information. Additional error sources arise from relationships between leak rates in testing and during operation, about which and about the way they depend on changes in pressure, temperature, and viscosity little is known in general; also, there is the failure to take into account the leak rate of the measuring system itself. On the whole, the known methods for determining the total leak rate of a system only constitute an approximate leakage test.

Determination of the total leak rate of a system, e.g., a pressure device or a group of pressure devices, may also be estimated by multiplying all potential leakage sites, such as solders, joints, screw connections, etc., by the proven leak rate of the leakage sites. However, the problem then arises that if the leak rate of a potential leakage site is not detectable, the calculation will yield a negligible total leak rate, although in fact there is a relevant leak rate which may be far greater than that maximally allowed.

In addition, the total leak rate of the system is also derived by determining the quantity of process medium such as refrigerant to be resupplied during the course of operation. However, when a system is already in operation, repairing a leak is cost-intensive and time-consuming and in particular does not yield the desired accurate results.

Therefore, it would be desirable to provide a method with which small total leak rates may be determined with a high accuracy within a suitable time period, even in systems having large volumes of several dm³.

SUMMARY OF THE INVENTION

The method according to an embodiment of the system described herein for determining total leak rates of a system to be pressurized and connected to a control apparatus having a valve battery with a test side and a reference side, the valve battery being controllable via a measuring unit, includes the following steps: first, the system and the control apparatus are filled with a test medium (method step F). Next, the connection between the system and the control apparatus is closed. A reference leak situated on the valve battery is then opened to be able to determine a reference leak rate (method step H). Finally, the connection between the system and the control apparatus is opened again to then be able to determine the influence of the system on the reference leak rate (method step I).

The method according to the system described herein is thus based on connecting a suitable reference leak first to a small volume, namely a part of the control apparatus, and determining the leak rate caused by this reference leak, and to then connect the test side of the control apparatus to the system to be tested by opening the connection between the control apparatus and the system and then determining the influence of the system on the leak rate, which yields a measure of the total leak rate of the system.

The reference leak may be of a predetermined size, from which the reference leak rate is obtained as a function of the pressure, the temperature, and the viscosity of the test medium. Preferably, however, the reference leak rate is determined during the test procedure because the reference leak rate also depends on tolerances in the opening of the reference leak. The reference leak rate is determined in this case either by measuring the time required to achieve a predetermined pressure difference between the test side and a defined volume in the control apparatus, i.e., the reference side, or alternatively by measuring the subsequent correctly measurable pressure difference applied between the test side and the reference side after a predetermined time period has elapsed and determining the time until this pressure difference is reached.

The influence of the system on the reference leak rate is preferably determined in method step I by opening the connection between the test side and the system and again determining the reference leak rate. Since the system itself will of course also have leaks, the time until the predetermined pressure difference after a predetermined amount of time has elapsed and/or the time until the pressure difference is reached will vary. This change is a direct measure of the quotient of the volume and the total leak rate of the system to be tested.

There is preferably a check for the existence of a major leak during the method step of determining the influence of the system on the reference leak rate. If the change in time reveals that the system has such major leaks that a repair is first necessary, then the determination of the total leak rate may be terminated at this point in time.

In an embodiment of the system described herein, after filling the system and the control apparatus with a test medium, a stabilization phase is implemented (method step G). If a test medium is filled into a system, the result, due to temperature differences between the test medium and the system, is an unstable state in which there is a fluctuation in the absolute pressure within the system and the temperature of the test medium. The stabilization phase results in the system being stable for a certain time period. This time period should be at least as long as the measurement cycles to be expected.

In a particularly preferred embodiment of the present invention, a determination of the approximate volume of the system to be tested is performed (method step E). This determination preferably takes place before the method step of filling the system (method step F). Only when the volume of the system is known is it possible to reliably determine the total leak rate of the system.

For a rough determination of the approximate volume, the system and a defined volume in the control apparatus are first filled with a test medium (method step B). A connection from the test side to a reference volume is then opened, so that the test medium is able to expand into the reference volume (method step D). The pressure of the test medium is preferably measured before and after the expansion. Since pressure equalization proceeds rapidly enough, it may be assumed that the other parameters such as temperature in particular remain approximately constant, so the approximate volume of the system may be estimated from the pressure difference.

In an advantageous refinement of the present invention, a determination is made as a function of the approximate volume of the system as to whether another measurement leak is to be connected in parallel in addition to the reference leak. To be sure that the measurement time is short even in the case of large volumes of several $dm^3$, the possible total leak rate should additionally be increased by this known rate of the measurement leak. The additional measurement leak increases the leak rate on the reference side and has the advantage that it makes it possible to adjust the leak rate and thus also the measurement time in a targeted manner until a predetermined pressure difference is reached. The measurement leakage is selected so that the expected measurement time lasts only a few seconds to avoid influences of temperature fluctuation on the total leak rate.

After determining the measurement leak, the measurement leak rate caused by the measurement leak additionally connected on the reference side is preferably determined (method step K). This is preferably determined either by measuring the time required to achieve a predetermined pressure difference between the test side and the reference side or by measuring, after a predetermined time period has elapsed, the subsequent correctly measurable pressure difference applied between the test side and the reference side and determining the time until this pressure difference is reached.

A stabilization phase (method step D) is preferably also implemented after the method step of filling the system and the control apparatus (method step B) and before the method step of determining the approximate volume (method step E). This stabilization phase should also produce a stable state of the system after the test medium has been added and instabilities are possibly still present due to temperature differences.

In a method step (L) which ends the actual test procedure, after determining the measurement leak rate in the method step (K), the volume of the system and the total leak rate of the system are determined.

The total leak rate is preferably determined either by measuring the time required to reach a predetermined pressure difference between the system and the reference side or by measuring, after a predetermined time period has elapsed, the subsequent correctly measurable pressure difference applied between the system and the reference side and determining the time until this pressure difference is reached. The exact volume of the system and the exact total leak rate of the system may be determined from these measuring results.

According to a particularly preferred variant of the method, a check is performed as the first method step (A) to ascertain whether there is a leak within the valve battery between the test side, which may be connected to the system, and the reference side, which may be connected to the reference leak and/or to the measurement leak, with a differential pressure sensor and a valve being provided between the test side and the reference side. This method step is known as a self-test.

For the self-test, the connection from the valve battery to the system is preferably closed, the same pressure is applied to the test side and the reference side, the valve between the test side and the reference side is closed, and after a predetermined time difference the pressure difference across the differential pressure sensor is measured by the sensor. This measurement is based on the fact that the test side and the reference side have leaks and volumes of different sizes. A difference is thus to be expected across the differential pressure sensor. However, if the valve or the differential pressure sensor has a leak, the pressure between the test side and the reference side will be equalized. If, after a predetermined time difference, the pressure difference is less than a predetermined minimum difference, then the leak is greater than is tolerable and the control apparatus must be checked before additional measurements because the method according to the present invention is based essentially on determining the pressure difference between the test side and the reference side with a high accuracy, which is prevented by leakage between these two sides. Therefore, the self-measurement should be performed before each measurement to be performed on a system.

As an alternative, different pressures may be applied to the test side and the reference side for the self-test to check on whether this pressure difference is maintained over a certain time period or whether there is an equalization of pressure because of a leak in the valve or in the differential pressure sensor.

The self-leak rate of the control apparatus is preferably determined before the start of the actual test. Such a check need not necessarily be performed before each measurement but instead it is usually sufficient to perform a check at an interval of a few months, depending on the frequency with which the control apparatus is used.

To be able to determine the self-leak rate of the control apparatus, the connection between the control apparatus and the system is preferably closed, a pressure is applied to the control apparatus and after a predetermined time difference ($\Delta t$) has elapsed, the absolute pressure ($p_{abs.ST}$) and the temperature ($\theta_{N.ST}$) of the test medium in the control apparatus are measured over a time period to be calculated ($\Delta t^{def}_{Eig.}$).

The predetermined time difference $\Delta t$ is preferably determined as follows:

$\Delta t = 1 \text{ sPa} \cdot p^2_{abs/(Eig.)} / p_{amb}$ because a stable state is established after different periods of time, depending on the ambient air pressure and the pressure filled into the control apparatus.

Based on the dependence of a leak rate on pressure and temperature, the test time to be calculated is determined as follows:

$$\Delta t^{def}_{Eig.} = \Delta p^{def}_{Eig.} \cdot V^{def}_{Eig.} / q^{lim}_{Eig.} \cdot \sqrt{T^{def}_{Eig.}} / (\theta_{N.ST} - 173.15) \cdot (p^2_{abs.ST} - p^2_{amb}) / (p^{2def}_{Eig.} - p^2_{amb}),$$

where $\Delta p^{def}_{Eig.}$ denotes a fixed pressure difference in the self-measurement, $V^{def}_{Eig.}$ denotes the fixed volume in the self-test, $q^{lim}_{Eig.}$ denotes the maximum allowed leak rate and $p^{def}_{Eig.}$ denotes the fixed pressure in the self-test.

By determining the actual pressure drop after one-tenth of the predetermined time difference, the subsequent comparison preferably detects whether there is a major leak. If the pressure drop is $\Delta p_{Eig./1/10 \cdot t} > \Delta t^{def}_{Eig.} \cdot q^{lim}_{Eig.} \cdot V^{def}_{Eig.}$, then there is a major leak; if $\Delta p_{Eig./1/10 \cdot t} \leq \Delta t^{def}_{Eig.} \cdot q^{lim}_{Eig.} \cdot V^{def}_{Eig.}$, then there is no major leak. If there is a major leak, in this case the measurement may be terminated immediately and the system checked.

The self-leak rate ($q^{Prüf}_{Eig.}$) of the control apparatus is finally determined as follows: $q^{Prüf}_{Eig.} = V_{Eig.} \cdot (\Delta p_{Eig.} + (\theta_{N.Ist} + 273.35)/(\theta_{N.Ist} + 273.1) - p_{abs.Ist})/\Delta t_{Eig.}$ and compared with the maximum allowed self-leak rate.

Nitrogen is preferably used as the test medium.

The control apparatus according to an embodiment of the system described herein for performing the method has a valve battery which is controllable by a measuring unit, the valve battery having a test side and a reference side which are separated by a differential pressure sensor and a test-and-check valve connected in parallel thereto. With this embodiment, it is possible to connect one of the two sides to the system and the other of the two sides to a reference leak to thereby be able to determine first the leak rate caused by the reference leak on the basis of the defined volume of the reference side and then the influence of the system on this leak rate.

In another embodiment of the system described herein, the test side is connectable to the system via a system valve, so the system is easily connected to the test side and disconnected from it again.

A filling and emptying valve is preferably provided on the test side to be able to fill the control apparatus and the system to be tested with a test medium and be able to drain out the test medium again.

A connection for a pressure generator is preferably provided on the filling and emptying valve to be able to apply the required pressure to the control apparatus. The pressure generator is advantageously a pressurized gas container equipped with a pressure reducing valve.

In a further embodiment of the system described herein, a temperature sensor is provided on the test side to be able to measure the temperature of the test medium directly.

An embodiment of the system described herein in which an absolute pressure sensor is provided on the test side between the differential pressure sensor and the test-and-check valve, to also allow determination of the absolute pressure of the test medium, is advantageous in particular.

The test-and-check valve is advantageously a 3/3 valve to be able to completely close off the reference side on the one hand, while also being able to connect it to the test side on the other hand.

In yet a further embodiment of the system described herein, the measuring unit has an electronic analyzer. With this electronic analyzer, the required formulas, programs, and physical and chemical constants of the different test and process media may be stored, retrieved and processed on the one hand, while on the other hand, the pickup of measured values may be controlled and the measured values may be stored and analyzed. Depending on the result, the electronic analyzer may preferably display the method steps subsequent thereto and accompany them with comments and instructions via a display.

BRIEF DESCRIPTION OF THE DRAWINGS

An exemplary embodiment of the system described herein is explained in detail on the basis of the following figures.

FIG. 1 shows a schematic view of an exemplary embodiment of a control apparatus having a measuring unit and a valve battery.

DETAILED DESCRIPTION OF VARIOUS EMBODIMENTS

Figure 3:
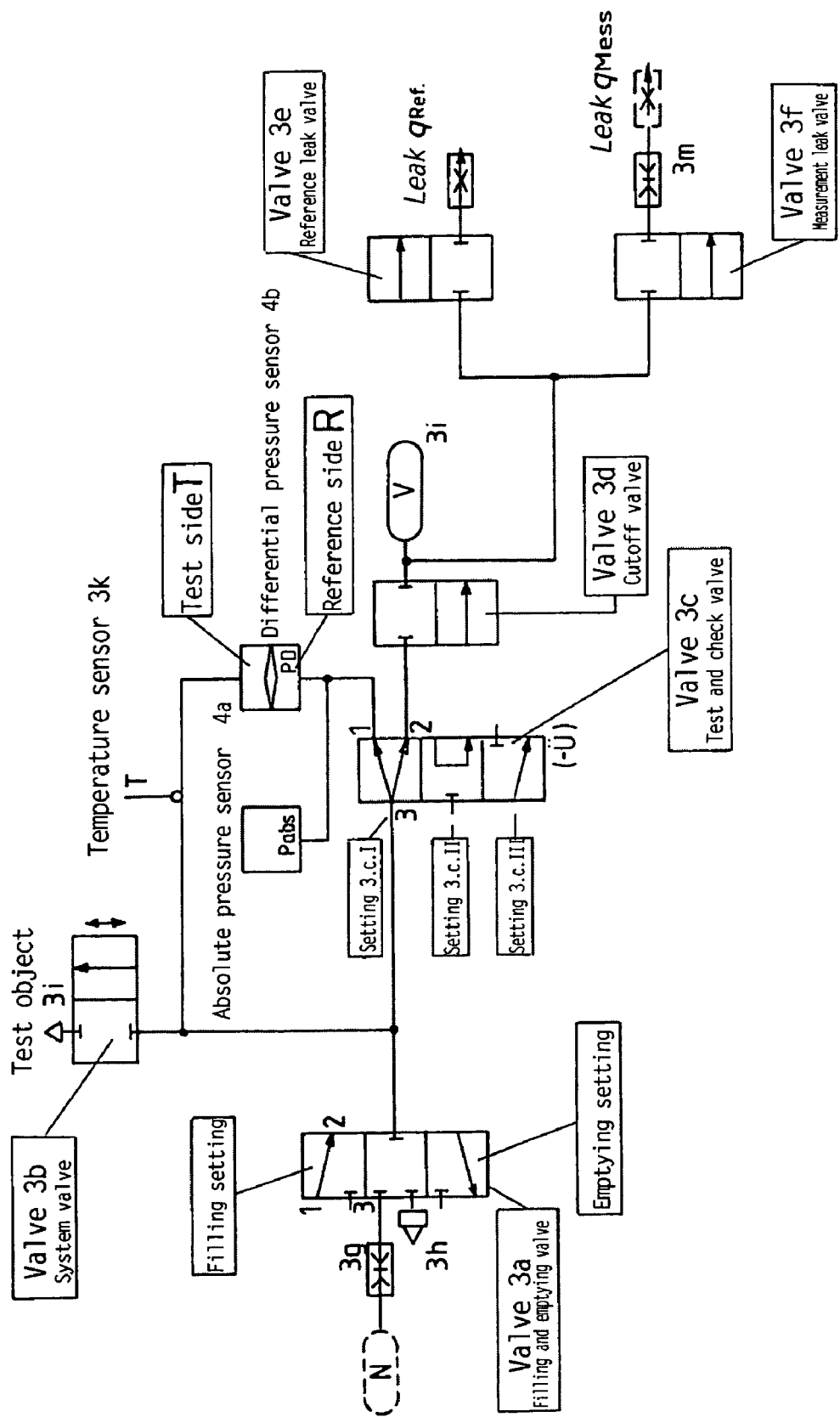
FIG. 3 shows a pneumatic schematic of the valve battery from FIG. 1

FIG. 1 shows a control apparatus according to an embodiment of the system described herein having a valve battery 1, whose pneumatic schematic is shown in FIG. 3, and a measuring unit 2. Measuring unit 2 is situated in an unbreakable electromagnetically compatible housing and has an absolute pressure sensor 4a and a differential pressure sensor 4b. The housing has a display 4e for displaying measured values and plain text; it also has an operating keypad 4f. Operating keypad 4f has the usual input keys, e.g., an ON/OFF key, a menu/ESC key, up and down arrow keys, plus select and enter keys. In addition, memory, measuring, and analyzer electronics 4g are also provided in the housing of measuring unit 2, as shown in detail in FIG. 4. Furthermore, measuring unit 2 has a connection 4c for a temperature sensor 3k and a pressure equalizing valve 4d.

FIG. 3 shows the pneumatic schematic of valve battery 1. Valve battery 1 has a filling and emptying valve 3a for filling a system to be tested, a system 7 having a test gas that is connectable via a snap-on coupling 3g to valve battery 1 and for emptying system 7, in particular for draining excess pressure off via a drain 3h. Filling and emptying valve 3a is connected on the one hand to a system valve 3b which opens and closes a connecting line 5 between valve battery 1 and system 7. On the other hand, filling and emptying valve 3a is connected to a 3/3 check-and-test valve 3c having negative switch overlap, which produces a pressure equalization in the system on switching from one setting to another. One of the outlets of 3/3 test-and-check valve 3c is connected to a cutoff valve 3d, downstream from which there is a pressure container 3l having a reference volume V. Furthermore, cutoff valve 3d has a branch to which a reference leak valve 3e for opening and closing a reference leak 6 on the one hand and a measurement leak valve 3f for opening and closing a measurement leak 3 are connected. The other outlet of 3/3 check-and-test valve 3c is connected to differential pressure sensor 4b of measuring unit 2, which is in turn connected to system valve 3b. Absolute pressure sensor 4a is situated between 3/3 check-and-test valve 3c and differential pressure sensor 4b. A temperature sensor 3k for picking up the ambient temperature is situated between differential pressure sensor 4b and system valve 3b. Furthermore, downstream from system valve 3b, valve battery 1 has a connection 3i for connection to system 7.

Measurement leak valve 3f is followed by a connection 3m for connecting measurement leak 3 to the valve battery. Reference leak 6 and measurement leak 3 are preferably designed as capillary tube leaks, so that the leakage flow may be expected to be viscous and laminar without exception throughout the entire working range of the control apparatus. Reference leak 6 has a reference leak rate $q_{Ref}$ on the order of $10^{-3}$ Pa·m³/s in the entire use range. Reference volume V is approximately 0.5 dm³ to 0.9 dm³. The magnitude of leak rate $q_{Mess.}$ of measurement leak 3 is selected so that the desired short measurement times of a few seconds are feasible.

System 7 to be tested is preferably an industrial refrigeration system that may be supplied with a refrigerant or coolant. However, nitrogen is preferably used as the test medium to test the total leak rate.

Figure 4:
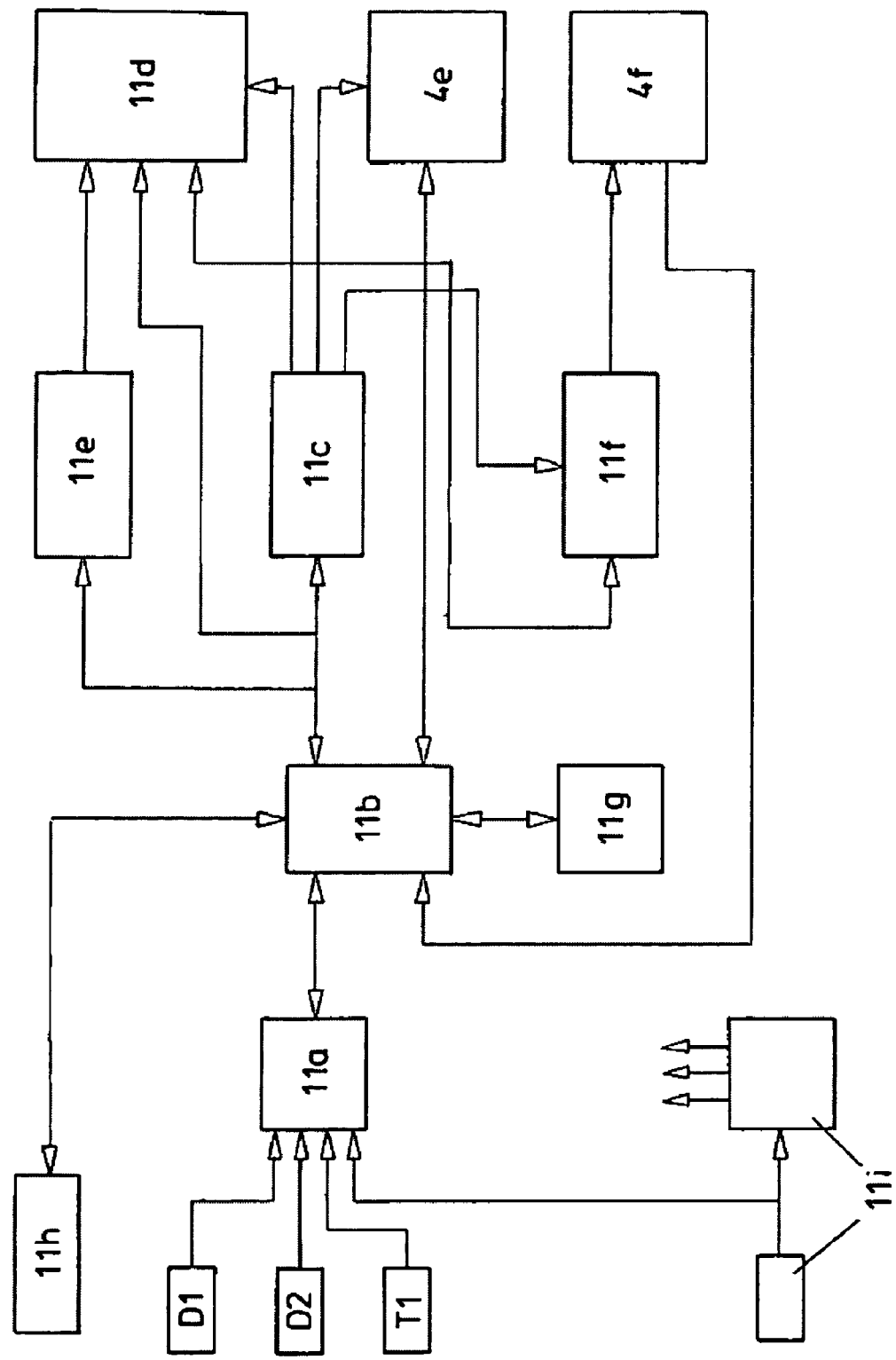
FIG. 4 shows a block diagram of the electronics used in the measuring unit according to FIG. 1.

FIG. 4 shows a block diagram of electronics 4g used in measuring unit 2 according to FIG. 1. Absolute pressure sensor 4a and differential pressure sensor 4b as well as temperature sensor 3k of measuring unit 2 supply electric signals D1, D2, and T1. Signals Dl of absolute pressure sensor 4a and T1 of temperature sensor 3k are supplied directly to an analog-digital converter 11a, which is provided in a microprocessor, digitized, and then relayed to microprocessor 11b, in which the required software has been installed for the operations described below. Absolute pressure sensor 4a and temperature sensor 3k ensure that analog-digital converter 11a is able to implement a measured value pitch of more than 50,000.

Analog signals D2 of differential pressure sensor 4b are sent in a first step to an analog-digital converter 11c via an interface 11e, converted by this analog-digital converter 11c and subsequently processed by analog-digital converter 11a of microprocessor 11b after setting a suitable measurement window.

Microprocessor 11b is connected to operating keypad 4f of measuring unit 1 by which the corresponding operations are controllable. In addition, microprocessor 11b is connected to display 4e of measuring unit 2 to be able to control the input commands and directly output the resulting measured values.

Microprocessor 11b is connected to a program and data memory 11d. The programs to be used as well as the measured values obtained from the measurements, in particular the measurement protocols as well as the formulas to be used and relevant physical and chemical constants for the test gases and the media used in the operating state of the system—all are stored in this program and data memory 11d. Furthermore, information about the different systems and the various clients may also be stored in program and data memory 11d. The maximum allowed total leak rates, which may vary from one country to the next, may also be stored in program and data memory 11d.

A real-time clock (not shown) is connected to microprocessor 11b to allow storage of all data in program and data memory 11d with time resolution and in conjunction with the particular client or particular system.

Microprocessor 11b may be connected via an interface 11h to an external personal computer or some other device for storing and processing data.

Finally, a power supply 11i, implemented either by a battery or the public power supply network, is connected to analog-digital converter 11a of microprocessor 11b. If the power supply is provided via a battery, the prevailing battery voltage is monitored and the remaining capacity is displayed on display 4e of measuring unit 1 to inform the user about the charge status of the battery.

FIGS. 2a through 2d show a program flow chart of the method according to the present invention. The following table also gives an overview of the settings of the individual valves during various method steps A through M.

TABLE 1

Settings of valves during various method steps.

| | | Valve 3a | Valve 3b | Valve 3c | Valve 3d | Valve 3e | Valve 3f |
|---|---|---|---|---|---|---|---|
| A | Self-test | CLOSED | CLOSED | Setting 2 | CLOSED | CLOSED | CLOSED |
| B | Filling the system | Filling setting | OPEN | Setting 1 | CLOSED | CLOSED | CLOSED |
| D | Stabilizing | CLOSED | OPEN | Setting 1 | CLOSED | CLOSED | CLOSED |
| E | Determining approx. volume | CLOSED | OPEN | Setting 1 | OPEN | CLOSED | CLOSED |
| F | Filling the system | Filling setting | OPEN | Setting 1 | OPEN | CLOSED | CLOSED |
| G | Stabilizing | CLOSED | OPEN | Setting 1 | OPEN | CLOSED | CLOSED |
| H | Determining the reference leak | CLOSED | CLOSED | Setting 2 | OPEN | OPEN | CLOSED |
| I | Determining the system influence | CLOSED | OPEN | Setting 2 | OPEN | OPEN | CLOSED |
| K | Determining the measurement leak | CLOSED | CLOSED | Setting 2 | OPEN | OPEN | OPEN |
| L | Volume and leak rate | CLOSED | OPEN | Setting 3 | OPEN | OPEN | OPEN |
| M | Emptying | Emptying setting | OPEN | Setting 1 | OPEN | OPEN | OPEN |

The program flow chart is divided into four parts in FIGS. 2a through 2d. The numbers in circles refer to the continuation of the program scheme on other pages.

The numbers shown in rectangles are arranged on the left margin of the program scheme, subdividing the scheme into individual procedures. The start of the measurement mode is shown as number 1 in FIG. 2a. The test mode for determining the total leak rate of a system is described under number 2 in FIGS. 2a through 2d. The procedure under number 3 in FIG. 2d describes how stored values may be reviewed and changed. The procedure by which the self-leak rate of the control apparatus is determined is described under number 4 in FIG. 2d. Under number 5 in FIG. 2d is described how system settings of the measuring unit may be revised and adjusted.

Reference is made, in particular, to the component of the method for determining the total leak rate and the internal volume of a system which is described under number 2 of the program flow chart in FIGS. 2a through 2d. Before the start of the actual test, a determination of the self-leak rate of the control apparatus may be performed, as described under number 4 of the program flow chart in FIG. 2d.

Figure 2A:
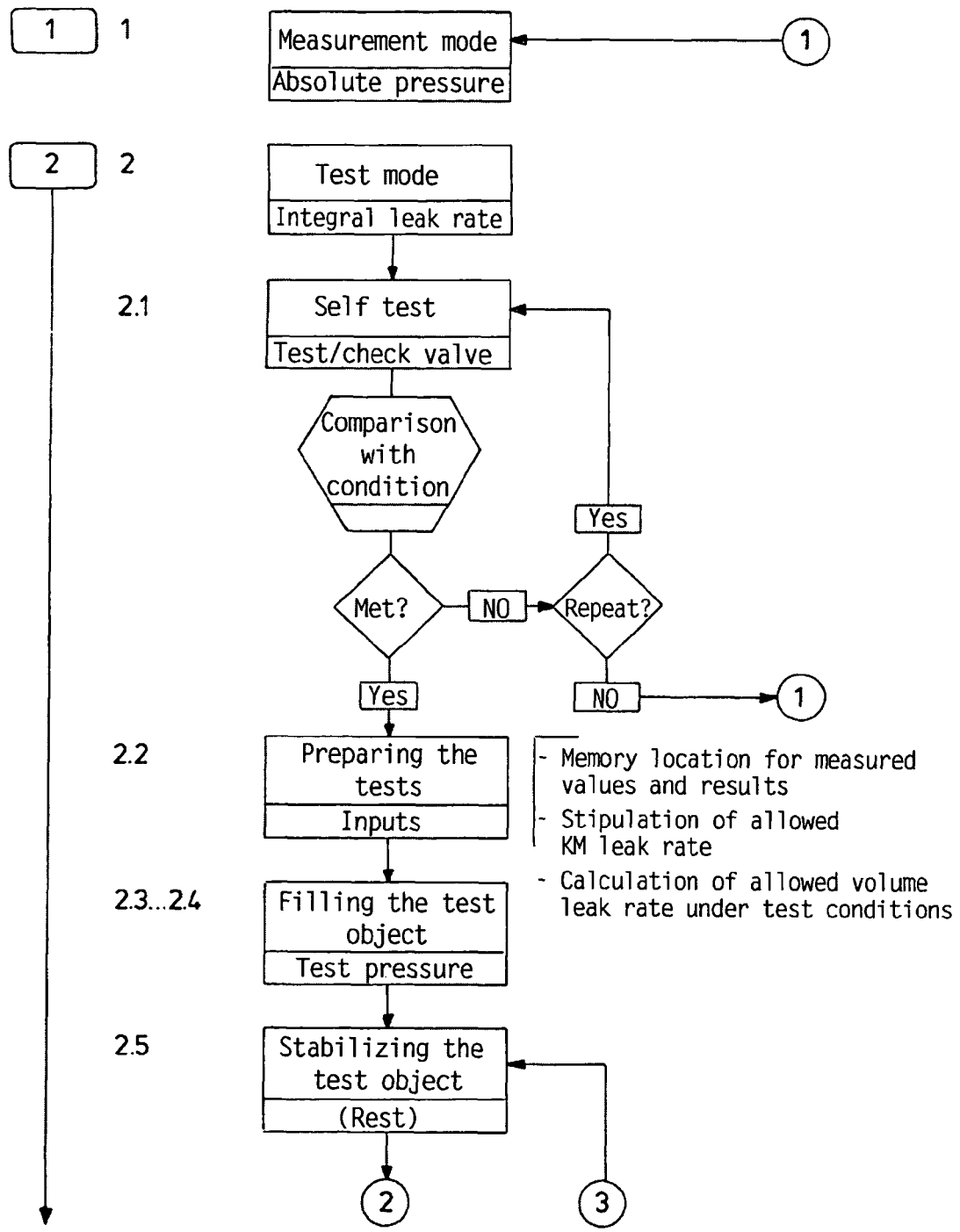
FIG. 2a shows a program flow chart for implementing the method according to the an embodiment of system described herein.
Figure 2:
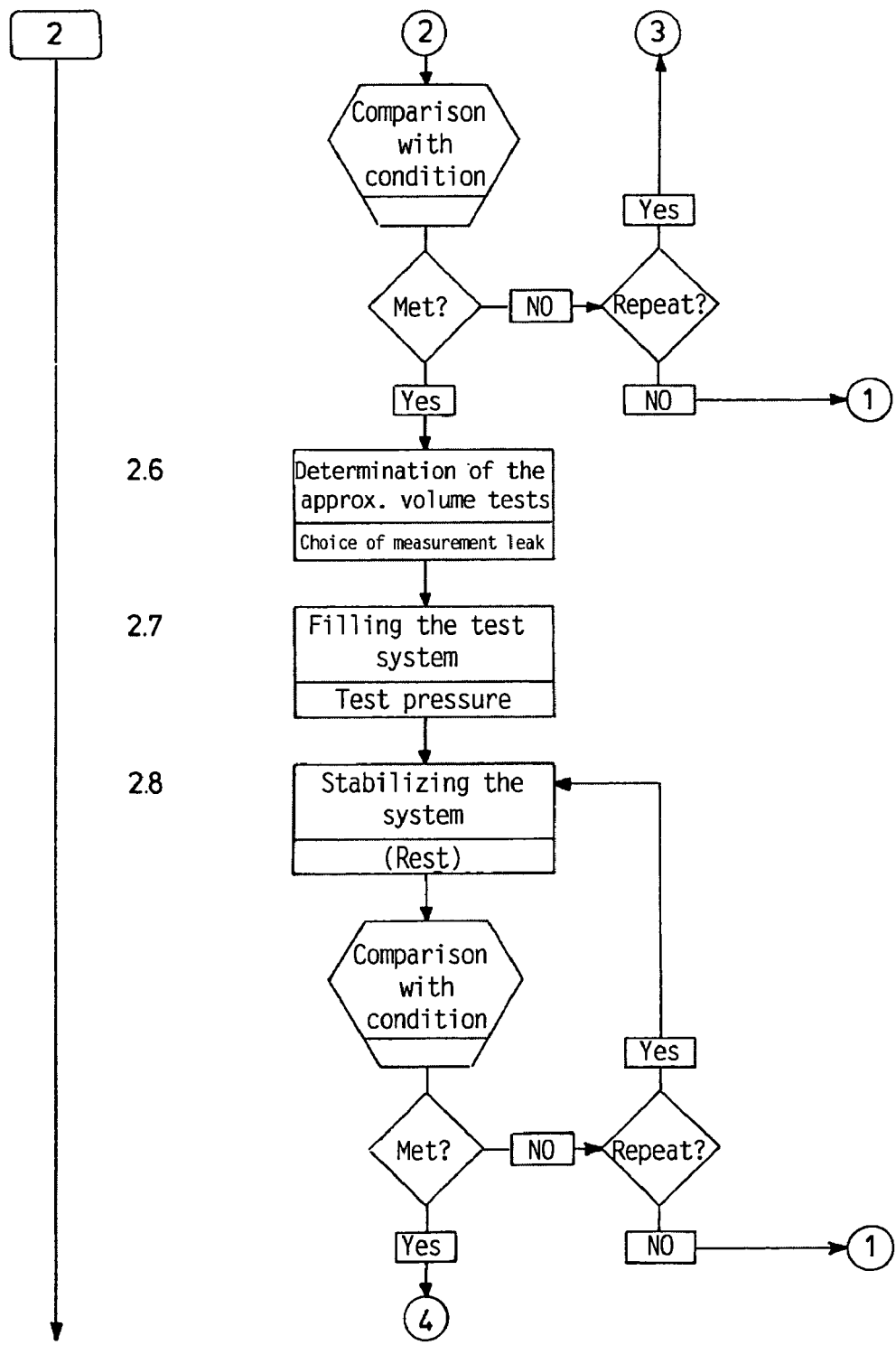
FIG. 2b shows a continuation of the program flow chart from FIG. 2a, FIG. 2c shows a continuation of the program flow chart from FIG. 2b.
FIG. 2d shows a continuation of the program flow chart from FIG. 2c.

To perform the actual test of the total leak rate of a system, first a self-test is performed before each measurement (method step A, see number 2.1 of the program flow chart in FIG. 2a). In this self-test, a check is performed to ascertain whether the there is a leak between test side T and reference side R in differential pressure sensor 4b or test-and-check valve 3c. Such leaks would drastically distort the measurement [result] to determine the total leak rate of a connected system.

For self-measurement A, all valves 3a through 3f of valve battery 1 are closed (see Table 1). To be able to completely fill the control apparatus with a test medium, 3/3 test-and-check valve 3c is then brought into setting I, in which the side of differential pressure sensor 4b facing reference side R and the cutoff valve together with the reference volume $V_{Kontr}$ are both connected to the input of 3/3 test-and-check valve 3c. Connecting line 5 to system 7 is closed with a blind plug and system valve 3b is opened. By switching the filling and emptying valve 3a to the filling setting, the control apparatus is filled with the test medium, preferably nitrogen, up to a certain test pressure, which is between 20 and 30 bar. Filling and emptying valve 3a is then closed again.

Introducing the test medium into the control apparatus may result in instabilities due to temperature differences between the test medium and the control apparatus. To be able to bring the control apparatus including the test medium filled into it to a stable state, a stabilization phase is inserted in between, during which absolute pressure $p_{abs/(A)}$ is monitored on absolute pressure sensor 4a and temperature $\theta_{N(A)}$ of the test medium is monitored on temperature sensor 3k. A stable state has been reached when pressure $p_{abs/(A)}$ does not exceed or fall below the predetermined limit values $p^{lim}_{abs/max}$ and $p^{lim}_{abs/min}$, respectively which are stored in program and data memory 11d of measuring unit 2 during a predetermined time period $\Delta t^{def}_{(A.1)}$.

Once the stable state has been reached, test-and-check valve 3c is brought into setting II, in which reference side R is separated from test side T. However, the same pressure is applied to both sides. The self-test is then based on the knowledge that test side T and reference side R both have leaks because no volume is completely tight, but these leaks as well as the volume are of different magnitudes. After a predetermined time difference $\Delta t^{def}_{(A.2)}$, a differential pressure $\Delta_{p(A)}$ would thus have to build up across differential pressure sensor 4b. However, if there are leaks between test side T and reference side R, the pressure is equalized either across differential pressure sensor 4b or across test-and-check valve 3c. Therefore, in the self-test, after predetermined time difference $\Delta t^{def}_{(A.2)}$ has elapsed, pressure difference $\Delta p_{(A)}$ is measured and compared with a predetermined minimum pressure difference $\Delta p^{def}_{(A)}$ which is also stored in program and data memory 11d (see number 2.1 of the program flow chart in FIG. 2a). Only if pressure difference $\Delta p_{(A)}$ is greater than minimum pressure difference $\Delta p^{def}_{(A)}$ may it be assumed that test-and-check valve 3c and differential pressure sensor 4b are both sufficiently tight to be able to perform the subsequent measurements with the required accuracy.

If this condition is met, test-and-check valve 3c is brought back to setting 1, in which a pressure equalization is performed between test side T and reference side R, and then the control apparatus is emptied via filling and emptying valve 3a to allow use of the control apparatus for additional measurements. The final pressure of the control apparatus is checked again before reusing the control apparatus. If a leak has been detected on test-and-check valve 3c or across differential pressure sensor 4b, a check should also be performed across the control apparatus.

After conclusion of the self-test, the actual measurement is performed to determine the total leak rate of a system 7. Before preparing the test, the client and corresponding system 7 are selected or entered as new data as measuring unit 2 at number 2.2 of the program flow chart in FIG. 2a. In addition, characteristic data of system 7 are entered into the measuring unit for calculation of the mass leak rate during operation and the volume leak rate under test conditions as well as the allowed leak rates.

The actual determination of the total leak rate is performed next, beginning first with an approximate determination of the volume of system 7. The system, including the control apparatus, is first filled with a test medium (method step B, see number 2.3 of the program flow chart in FIG. 2a).

All valves 3a through 3f are closed first. Next the test-and-check valve is set to setting 1, so that, during a filling process, test side T and reference side R are both filled with a test medium. In addition, system valve 3b, connecting the control apparatus to system 7, is also opened. Finally, filling and emptying valve 3a is brought to the filling setting, and system 7, including the control apparatus, is filled with a pressure between 20 and 30 bar (see Table 1, method step B). Filling and emptying valve 3a is then closed again (see Table 1, method step D). apparatus, is filled with a pressure between 30 and 30 bar (see Table 1, method step B). Filling and emptying valve 3a is then closed again (see Table 1, method step D).

In a method step C (indicated by number 2.4 of program flow chart in FIG. 2a), volume leak rates $q_{Pr1}$ and $q_{Pr2}$ are calculated a follows:

$$q_{Pr1} = m_{R\ldots} \cdot R \cdot T_{S\ddot{a}tt}/M_{R\ldots} \cdot a$$

$$q_{Pr2} = q_{Pr1} \cdot \eta''_{R\ldots}/\eta_N$$

where $m_{R\ldots}$ denotes the leak rate, expressed as mass flow, R denotes the general gas constant, $T_{S\ddot{a}tt}$ denotes the absolute temperature of the process medium at saturation pressure, $M_{R\ldots}$ denotes the molar mass of the process medium, $\eta''_{R\ldots}$ denotes the dynamic viscosity of the process medium, and $\eta_N$ denotes the dynamic viscosity of the test medium.

At the same time, system 7, including the control apparatus, is in a stabilization phase (method step D, see number 2.5 in the program flow chart in FIG. 2a) to stabilize any existing instabilities caused by temperature differences between the added test medium and the control apparatus or system 7.

During stabilization phase D, the absolute pressure $p_{abs/(D)}$ of the test medium is measured during a predetermined time interval $\Delta t^{def}_{(D)}$. A stable state is reached when, during stabilization phase D, absolute pressure $p_{abs/(D)}$ of the test medium does not exceed or fall below predetermined limit values $p^{lim}_{abs/max}$ and $p^{lim}_{abs/min}$ during the time period $\Delta t^{def}_{(D)}$.

In addition, temperature $\theta_{N(D)}$ of the test medium is measured during stabilization phase D. A stable state is reached when the fluctuations in temperature $\theta_{N(D)}$ during time period $\Delta t^{def}_{(D)}$ do not exceed a predetermined value $\Delta \theta_{zul}$ during stabilization phase D (see number 2.5 of the program flow chart in FIGS. 2a and 2b). This predetermined limit value $\Delta \theta_{zul}$ is calculated as follows:

$$\Delta \theta_{zul} = (((p_{abs/(D)} - ((\Delta p^{def} </\phi_\theta) \cdot (\phi_\theta - 1))) \cdot (\theta_{N(E)} + 273.15)/p_{abs/(D)})) - (\theta_{N(D)} + 273.15),$$

where $\phi_\theta$ is the temperature error factor.

Predetermined time interval $\Delta t^{def}_{(D)}$ is determined as follows:

$$\Delta t_{(D)} = \Delta\theta / \Delta\theta_{zul} \cdot t^{def<}$$

where $t^{def<}$ denotes the shortest measurement cycle.

After these preparations, a determination of approximate volume $\tilde{V}_{Syst.}$ of system 7 may be performed in a method step E (see number 2.6 of the program flow chart in FIG. 2*b*) by opening cutoff valve 3*d* (see Table 1, method step E). A reference volume $V_{Kontr.}$ having a defined volume of approximately 0.4 L to 0.9 L is situated downstream from cutoff valve 3*d*. The test medium in the system and in the remaining part of the control apparatus expands into reference volume $V_{Kontr.}$ which produces a change in pressure in system 7. With a drop in predetermined differential pressure $\Delta p^{def}_{(E)}$ of 2 hPa, for example, at differential pressure sensor 4*b*, the measurement is started and ended at a stable value. Approximate volume $\tilde{V}_{Syst.}$ of system 7 is calculated from the measured values as follows:

$$\tilde{V}_{Syst.} = V_{Kontr.} / ((p_{abs/(E)ST.}/p_{abs/(E)E.}) - 1),$$

where $p_{abs(E)ST.}$ is the absolute pressure of the test medium at the start of the measurement and $p_{abs/(E)E.}$ is the absolute pressure of the test medium after conclusion of the measurement.

Whether one of the three predetermined additional measurement leaks 3 is connected in parallel in addition to reference leak 6 is determined as a function of approximate volume $\tilde{V}_{Syst.}$ of system 7. Reference leak 6 is designed so that measurement times of a few seconds are obtained for determination of the total leak rate in the case of a small volume. However, if the volume is larger, e.g., a few dm³, the measurement time is lengthened accordingly. To avoid greater temperature fluctuations than those taken into account in the calculations, which distort the measuring result, reference leak 6 is increased by adding another measurement leak 3, which is determined as a function of the size of volume $\tilde{V}_{Syst.}$ of system 7 to thereby shorten the measurement time again. Required measurement leak 3 is displayed by measuring unit 1 on display 4*e* and is installed by the user on measurement leak valve 3*f*.

For the actual determination of the total leak rate, the system is then filled with a test medium again up to the desired test pressure in another method step F (see number 2.7 in the program flow chart in FIG. 2*b* and Table 1, method steps F and G).

There follows another stabilization phase (method step G) to compensate for any temperature differences that may exist between the test medium and the control apparatus or system 7 and to bring system 7 to a stable state (see number 2.8 in the program flow chart in FIG. 2*b*).

During stabilization phase G, absolute pressure $p_{abs/(G)}$ of the test medium is measured during a predetermined time interval $\Delta t^{def}_{(G)}$. The absolute pressure of test medium $p_{abs/(G)}$ must not exceed or fall below predetermined limit values $p^{lim}_{abs/max}$ and $p^{lim}_{abs/min}$ during time interval $\Delta t^{def}_{(G)}$.

During stabilization phase G, temperature $\theta_{N(G)}$ of the test medium is also measured. Fluctuations in temperature $\theta_{N(G)}$ must not exceed a predetermined value $\Delta\theta_{zul}$ during the time interval $\Delta t^{def}_{(G)}$ (see number 2.8 in FIG. 2*b*); otherwise, stabilization phase G must be repeated. This predetermined limit value $\Delta\theta_{zul}$ is calculated as follows:

$$\Delta\theta_{zul} = (((p_{abs/(G)} - ((\Delta p^{def<}/\phi_\theta) \cdot (\phi_\theta - 1))) \cdot (\theta_{N(G)} + 273.15)) / p_{abs/(G)}) - (\theta_{N(G)} + 273.15),$$

where $\phi_\theta$ is the temperature error factor.

Predetermined time interval $\Delta t^{def}_{(G)}$ is calculated as follows:

$$\Delta t^{def}_{(G)} = \Delta\theta / \Delta\theta_{zul} \cdot t^{def<}$$

where $t^{def<}$ is the unit of time of the shortest measurement cycle.

At the same time, during stabilization phase G, another volume leak rate $q_{Pr3}$ is calculated as follows:

$$q_{Pr3} = q_{Pr2} \cdot (p^2_{abs/(F)} - p^2_{amb}) / (p^2_{Sätt} - p^2_{amb}),$$

where $p_{abs/(F)}$ denotes the test pressure up to which the system was filled during the method step of filling (F), $p_{amb}$ denotes the atmospheric pressure, and $p_{Sätt}$ denotes the saturation pressure of the process medium at ambient temperature. This takes into account the fact that, with the individual leaks to be expected, the flows are viscous and laminar almost without exception or they behave as at the beginning of a Knudsen flow. There is a quadratic relationship between the leak rate and the difference between the internal pressure and the external pressure.

First, reference leak rate $q_{Ref.}$ of reference leak 6 is determined in a method step H (see number 2.9 in FIG. 2*c*), where the determination of the reference leak by measuring is to be given priority over a fixed definition because a definition of a reference leak is based on a defined magnitude of reference leak 6, which, however, is subject to tolerances having effects on actual reference leak rate $q_{Ref.}$ that should not be underestimated. In addition, the actual reference leak rate depends on pressure and temperature, which may vary greatly. Therefore, determining reference leak 6 by measuring is described below. The leaks of the control apparatus are also included in the reference leak rate. Since the leak rate is determined at prevailing ambient conditions and at the existing test pressure, this eliminates the conversions of rates that would otherwise be necessary.

For determination of reference leak rate $q_{Ref.}$, system valve 3*b* is closed and test-and-check valve 3*c* is brought into setting II, so that reference side R is uncoupled from the additional parts, in particular test side T of the control apparatus, and reference leak valve 3*e* is opened (see Table 1, method step H). Reference side R with differential pressure sensor 4*b* is thus connected to reference leak 6.

Time $\Delta t_{Prüf.(H)}$, which is needed to achieve a predefined pressure difference $\Delta p^{def}_{(H)}$ between test side T and reference side R, is now measured. Alternatively, reference leak rate $q_{Ref.}$ may be determined, after a predefined time $\Delta t^{def}_{(H)}$ has elapsed, the subsequently following, correctly measurable applied pressure difference $\Delta p_{(H)}$ between test side T and reference side R is measured, and time $\Delta t_{Prüf(H)}$ until reaching this pressure difference $\Delta p_{(H)}$ is determined. The measurements may be repeated several times, with the number of repeats being given by $W^{def}_{(H)}$. The results of the repeats are averaged.

Reference leak rate $q_{Ref.}$ is calculated as follows:

$$q_{Ref.} = V_{Kontr.} \cdot \Delta p^{def}_{(H)} / \Delta t_{Prüf(H)}$$

or alternatively as follows:

$$q_{Ref.} = V_{Kontr.} \cdot \Delta p_{(H)} / \Delta t_{Prüf(H)}$$

Finally, there should also be a check to determine whether ascertained reference leak rate $q_{Ref.}$ is between predetermined limit values, which are determined as follows:

$$q^{lim}_{Ref.min.} = (q^{def}_{Ref.} \cdot (p^2_{abs.(H)} - p^2_{amb}) / (p^{2def}_{Ref.} - p^2_{amb})) \cdot 0.9$$

$$q^{lim}_{Ref.max.} = (q^{def}_{Ref.} \cdot (p^2_{abs.(H)} - p^2_{amb}) / (p^{2def}_{Ref.} - p^2_{amb})) \cdot 1.1$$

If ascertained reference leak rate $q_{ref}$ is not between predetermined limit values $q^{lim}_{Ref.min}$ and $q^{lim}_{Ref.max}$, then the control apparatus should be checked.

Figure 2C:
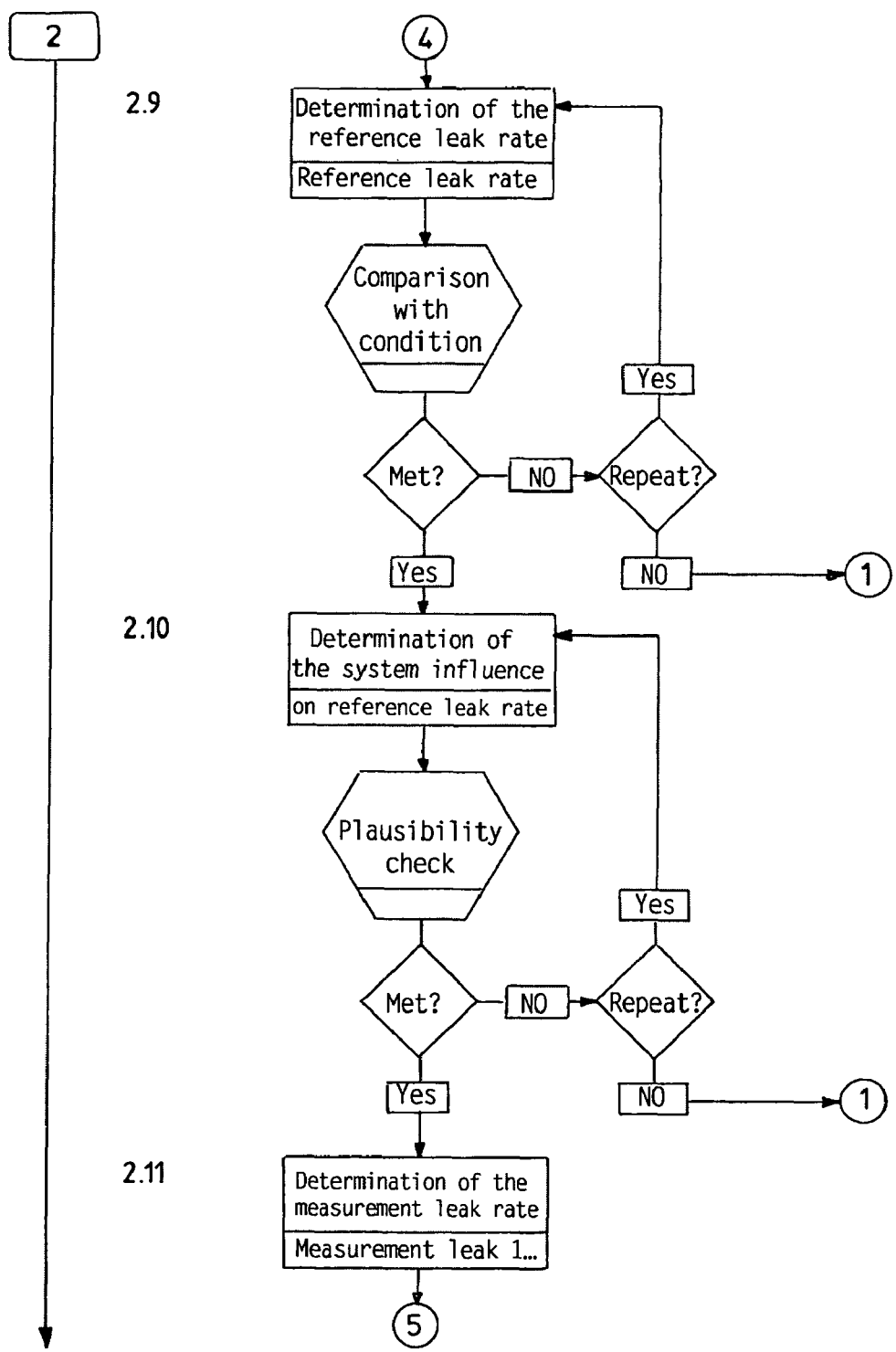
Figure 2D:
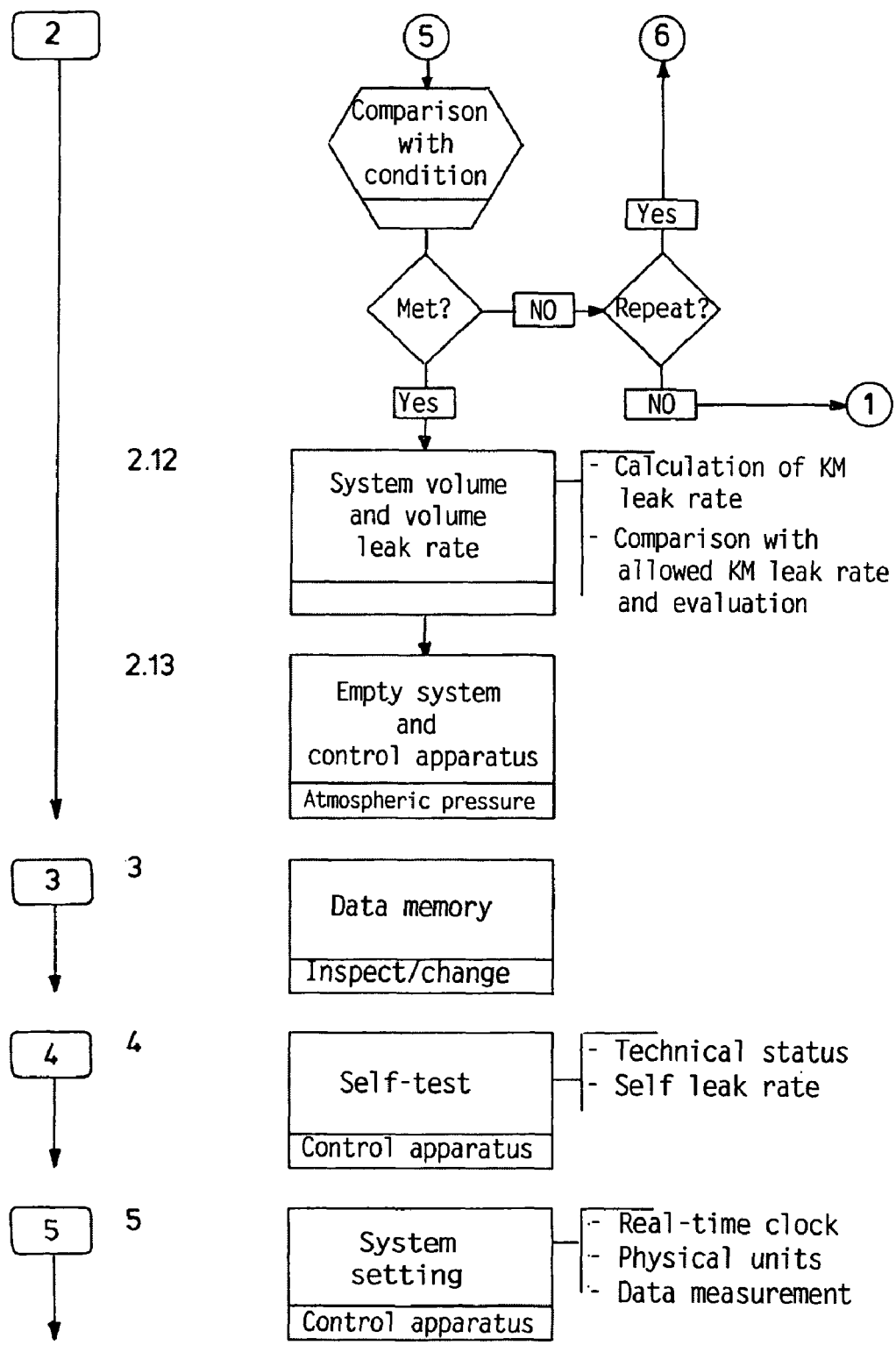

Otherwise in another method step (I) the influence of test system 7 on the leak rate is checked (see number 2.10 of the program flow chart in FIG. 2c). System 7 is switched to test side T by opening system valve 3b (see Table 1, method step I). Since system 7 also has leaks, test time $\Delta t_{Prüf.(I)}$ is to be changed as a function of the magnitude of these leaks and the volume of system 7 which is to be determined.

Again, reference leak rate $q_{Ref}$, which is altered under the influence of system 7, is determined by measuring a time $\Delta t_{Prüf(I)}$ needed to reach a predefined pressure difference $\Delta p^{def}_{(I)}$ between the system (7) and the reference side (R).

Alternatively, a changed reference leak rate $q_{Ref}$ may be determined by measuring, after a predefined time $\Delta t^{def}_{(I)}$ has elapsed, the next following correctly measurable applied pressure difference $\Delta p_{(I)}$ between the system (7) and the reference side (R) and determining a time $\Delta t_{Prüf.(I)}$ until reaching this pressure difference $\Delta p_{(I)}$. The measurements may also be repeated several times, with the number of repeats being given by the number of repeats $W^{def}_{(H)}$ in the preceding method step (H) of determination of the reference leak rate. The results of the repeats are averaged.

From resulting time $\Delta t_{Prüf.(I)}$ for pressure drop $\Delta p_{(I)}$ the influence of system $\Delta p_{\Phi Syst.}$, which is a measure of the quotient of the volume and the total leak rate of system 7, is calculated as follows:

$$\Delta p_{\Phi Syst.} = (\Delta t_{Prüf(I)} / (V_{Kontr.} / q_{Ref.} \cdot ((p^2_{abs(I)} - p^2_{amb}) / (p^2_{abs(H)} - p^2_{amb})))) - \Delta p^{def}_{(I)} \text{ or}$$

$$\Delta p_{\Phi Syst.} = (\Delta t_{Prüf(I)} / (V_{Kontr.} / q_{Ref.} \cdot ((p^2_{abs(I)} - p^2_{amb}) / (p^2_{abs(H)} - p^2_{amb})))) - \Delta p_{(I)}.$$

The influence of the system on the measuring result per second amounts to $\Delta p_{\Phi/S} = \Delta p_{\Phi/S} / \Delta t_{Prüf.(I)}$.

During the method step (I) of determination of the influence of system 7 on the leak rate, system 7 should be checked for the existence of a major leak.

A major leak may occur when time $\Delta t_{Prüf.(I)}$ exceeds a predetermined value, which is determined as follows:

$$\Delta t_{Prüf(I)} = 10 \cdot \Delta p(I) / (q_{Ref.} \cdot (p^2_{abs(I)} - p^2_{amb}) / (p^2_{abs(H)} - p^2_{amb}) / V_{Kontr.}) - (q_{Pr3} \cdot ((p^2_{abs(I)} - p^2_{amb}) / (p^2_{abs(H)} - p^2_{amb}) / V_{Syst.}).$$

If there is a major leak, the measurement may be terminated and system 7 tested. Otherwise, leak rate $q_{Mess1}$ of measurement leak 3 may be determined in a subsequent method step (K) (see number 2.11 in FIGS. 2c and 2d).

For this purpose, system valve 3b is closed again and test-and-check valve 3c is brought into setting I to first allow an equalization of pressure between test side T and reference side R. Finally, measurement leak valve 3f, downstream from which measurement leak 3, determined accordingly, is situated, is opened and test-and-check valve 3c is brought into setting II to uncouple reference side R (see Table 1, method step K). Measurement leak 3 thus has an effect only on reference side R, resulting in a pressure difference $\Delta P_{(K)}$ between test side T and reference side R that is to be measured across absolute pressure sensor 4a.

Measurement leak rate $q_{Mess1}$ is determined by measuring time $\Delta t_{Prüf.(K)}$ needed to reach a predefined pressure difference $\Delta p^{def}_{(K)}$ between test side T and reference side R. Alternatively, measurement leak rate $q_{Mess1}$ may in turn be determined by measuring, after a predetermined time $\Delta t^{def}_{(K)}$ has elapsed, the next following correctly measurable applied pressure difference $\Delta p_{(K)}$ between test side T and reference side R and by determining time $\Delta t_{Prüf.(K)}$ until this pressure difference $\Delta p_{(K)}$ is reached.

The number of possible repeats $W_{(K)}$ of the measurements is stored in program and data memory 11d.

Measured leak rate $q_{Mess1}$ may then be calculated as follows:

$$q_{Mess1} = V_{Kontr.} \cdot \Delta p_{(K)} / \Delta t_{Prüf.(K)} - q_{Ref.} \cdot ((p^2_{abs/(K)} - p^2_{amb}) / (p^2_{abs(H)} - p^2_{amb}))).$$

Finally, in a method step (L), volume $V_{Syst.}$ and total leak rate $q_{Syst.}$ of system 7 are determined (see number 2.12 of the program flow chart in FIG. 2d). Test-and-check valve 3c is therefore moved into setting I and system valve 3b is opened, so that system 7 is connected to test side T. Due to the fact that test-and-check valve 3c is brought into setting I, this ensures that, first, the same pressure prevails on test side T, including system 7, as well as on reference side R. Finally, test-and-check valve 3c is brought into setting III in which the side of differential pressure sensor 4b facing reference side R is uncoupled and exposed to an essentially constant pressure, while reference leak 6 and measurement leak 3 are connected to test side T, so that the pressure on test side T changes due to the leaks in system 7, reference leak 6, and measurement leak 3 (see Table 1, method step L).

Total leak rate $q_{Syst.}$ is now determined by measuring the time $\Delta t_{Prüf.(L)}$ which is needed to reach a predefined pressure difference $\Delta p^{def}_{(L)}$ between system 7 and reference side R, which is now formed only by the small volume between the side of differential pressure sensor 4b facing reference side R and test-and-check valve 3c. Alternatively, total leak rate $q_{Syst.}$ may be determined by measuring, after a predefined time $\Delta t^{def}_{(L)}$ has elapsed, subsequent correctly measurable applied pressure difference $\Delta p_{(L)}$ between system 7 and reference side R and determining the time $\Delta t_{Prüf(L)}$ until this pressure difference $\Delta p_{(L)}$ is reached.

As the end result, volume $V_{Syst.}$ of system (7) is calculated as follows:

$$V_{Syst.} = \Delta t_{(L)} / (\Delta p_{(L)} - \Delta p_{\Phi/S} \cdot \Delta t_{(L)}) \cdot (q_{Ref.} \cdot (p^2_{abs/(L)} - p^2_{amb}) / (p^2_{abs(H)} - p^2_{amb}) + q_{Mess1} \cdot (p^2_{abs/(L)} - p^2_{amb}) / (p^2_{abs(K)} - p^2_{amb})) - V_{Kontr.}.$$

Total leak rate $q_{Syst.}$ is obtained in the result as follows:

$$q_{Syst.} = ((V_{Syst.} + V_{Kontr.}) \cdot \Delta p_{(L)} / \Delta t_{Prüf(L)} - (q_{Ref.} \cdot (p^2_{abs/(L)} - p^2_{amb}) / (p^2_{abs(H)} - p^2_{amb}) + q_{Mess1} \cdot (p^2_{abs/(L)} - p^2_{amb}) / (p^2_{abs(K)} - p^2_{amb})).$$

Resulting total leak rate $q_{Syst.}$ (see number 2.12 in the program flow chart in FIG. 2d) is finally compared with a maximum allowed leak rate $m_{R...}$ which is stored in program and data memory 11d, adapted by the user to the specifics of system 7 and determined as follows:

$$m_{R...} = q_{Syst.} \cdot (p^2_{Sätt.} - p^2_{amb}) / (p^2_{abs(L)} - p^2_{amb}) \cdot \eta_N / \eta''_{R...} \cdot M_{R...} / (R \cdot T_{Sätt.}) \cdot a.$$

After conclusion of the tests, in a last method step (M), system 7 should be relieved by switching filling and emptying valve 3a to the emptying setting (see number 2.13 in FIG. 2d and Table 1, method step M). First, test-and-check valve 3c must be brought into setting I in which test side T is connected to reference side R and in particular to the small volume between differential pressure sensor 4b and test-and-check valve 3c.

All the values thus ascertained and the method steps to be performed are displayed on display 4e of measuring unit 2 to facilitate the implementation of this method by the operator. The results of the measurements and calculations are automatically stored in program and data memory 11d of measuring unit 2.

Depending on the frequency of use of the control apparatus, the self-leak rate of the control apparatus should be checked at regular intervals of a few months. This procedure is described under number 4 of the program flow chart in FIG. 2d.

For determining the self-leak rate of the control apparatus, all valves 3a through 3f of valve battery 1 are also closed, connecting line 5 to system 7 is closed with a blind plug, and system valve 3b is opened. The 3/3 test-and-check valve 3c is set in setting I and remains in this setting during the measurement of the self-leak rate, so that only one volume is then present in the control apparatus and no pressure differences are able to build up within the control apparatus. By switching filling and emptying valve 3a to the filling setting, the control filling is filled with the test medium, preferably nitrogen, up to a certain test pressure which is between 20 and 30 bar. Filling and emptying valve 3a is then closed again.

Introducing the test medium into the control apparatus may result in instabilities due to temperature differences between the test medium and the control apparatus. To convert the control apparatus, including the test medium filling it, to a stable state, there is a wait for a predefined time difference $\Delta t$ and only after this time difference $\Delta t$ has elapsed are the absolute pressure $p_{abs.ST}$ and temperature $\theta_{N.ST}$ of the test medium measured in the control apparatus over a time period $\Delta t^{def}_{Eig.}$ to be calculated. Predefined time difference $\Delta t$ is determined as follows:

$$\Delta t = 1 sPa \cdot p^2_{abs/(Eig.)}/p_{amb},$$

and time period $\Delta t^{def}_{Eig.}$ to be calculated, after which the measurement is terminated, is determined as follows:

$$\Delta t^{def}_{Eig.} = \Delta p^{def}_{Eig.} \cdot V^{def}_{Eig.}/q^{lim}_{Eig.} \sqrt{T^{def}_{Eig.}}/(\theta_{N.ST} - 173.15) \cdot (p^2_{abs.ST} - p^2_{amb})/(p^{2def}_{Eig.} - p^2_{amb}),$$

where $\Delta p^{def}_{Eig.}$ denotes a defined pressure difference in the self-measurement, $V^{def}_{Eig.}$ is the volume detected in the self-test, $q^{lim}_{Eig.}$ is the maximum allowed leak rate, and $p^{def}_{Eig.}$ is the pressure detected in the self-test. Detected pressure difference $\Delta p^{def}_{Eig.}$ is defined in such a way that in the subsequent calculation an error of approximately 0.2 K in the temperature difference between temperature $\theta_{N.ST}$ of the test medium at the start of the measurement and temperature $\theta_{N.E}$ of the test medium at the end of the measurement may be taken into account.

Actual pressure drop $\Delta p_{Eig./t}$ after time difference $\Delta t^{def}_{Eig.}$ is determined as follows:

$$\Delta P_{Eig./t} = p_{abs.ST} \cdot (\theta_{N.Ist} + 273.15/\theta_{N.ST}) - p_{abs.Ist},$$

where $p_{abs.ST}$ denotes the absolute pressure at the start of the measurement, $\theta_{N.Ist}$ denotes the temperature of the test medium after time difference $\Delta t^{def}_{Eig.}$, $\theta_{N.ST}$ denotes the temperature at the start of the measurement, and $p_{abs.Ist}$ denotes the absolute pressure after time difference $\Delta t^{def}_{Eig.}$.

To be able to ascertain whether there is a major leak in the control apparatus, actual pressure drop $\Delta p_{Eig./t}$ is determined after a time difference of $1/10 \cdot \Delta t^{def}_{Eig.}$. If this pressure difference is $$\Delta p_{Eig./1/10 \cdot t} > \frac{1}{2} (\Delta t^{def}_{Eig.} \cdot q^{lim}_{Eig.} \cdot V^{def}_{Eig.}),$$

then there is a major leak and the determination of the self-leak rate should be terminated and the control apparatus should be serviced, but if this pressure difference is $$\Delta p_{Eig./1/10 \cdot t} \leq \frac{1}{2} (\Delta t^{def}_{Eig.} \cdot q^{lim}_{Eig.} \cdot V^{def}_{Eig.}),$$

there is no major leak and the control apparatus may remain in use.

Actual self-leak rate $q^{Prüf}_{Eig.}$ of the control apparatus is then determined as follows, taking into account a temperature error of 0.2 K:

$$q^{Prüf}_{Eig.} = V_{Eig.} \cdot (\Delta p_{Eig.} + (\theta_{N.Ist} + 273.35)/(\theta_{N.Ist} + 273.1) - p_{abs.Ist})/\Delta t_{Eig.}.$$

Next, self-leak rate $q^{Prüf}_{Eig.}$ of the control apparatus is compared with maximum allowed self-leak rate $q^{lim}_{Eig.}$. If the leak rate is too high, either the test should be repeated or it may be necessary to check and service the control apparatus. Otherwise, the ascertained self-leak rate is stored in program and data memory 11d to be taken into account again in further measurements.

After conclusion of the measurement of self-leak rate $q^{Prüf}_{Eig.}$ of the control apparatus, the control apparatus is emptied and the test medium is drained out by switching filling and emptying valve 3a to the emptying setting.

The ascertained values may be inspected and altered at number 3 of the program flow chart in FIG. 2d. Program and data memory 11d is therefore selected via the measuring unit and the corresponding data are selected using operating keypad 4f, whereupon the results are displayed on display 4e.

The system settings of measuring unit 2 are stored in program and data memory 11d and may be inspected and revised at number 5 of the program flow chart in FIG. 2d. In particular, real-time clock 11g may be set, the physical units that are to be used (e.g., whether the pressure is to be displayed in Pa or hPa) may be selected, or program and data memory 11d may be completely erased.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for determining total leak rate of a system to which a pressure is applied and which is connected to a control apparatus having a valve battery with a test side and a reference side, the valve battery being controllable via a measuring unit, which method comprises the following steps:
   filling the system and the control apparatus with a test medium;
   closing the connection between the system and the control apparatus;
   providing a reference leak on the valve battery;
   determining a first reference leak rate of the reference leak;
   opening the connection between the system and the control apparatus;
   after opening the connection, determining a second reference leak rate of the reference leak according to influence by the system; and
   using a difference between the first reference leak rate and the second reference leak rate of the reference leak of the control apparatus in determining the total leak rate of the system.

2. The method as recited in claim 1, wherein the reference leak is connected to a reference volume within the control apparatus, the reference side, during the step of determining the first reference leak rate.

3. The method as recited in claim 1, wherein the first reference leak rate is determined by measuring a time required to achieve a predetermined pressure difference between the test side and the reference side.

4. The method as recited in claim 1, wherein the first reference leak rate is determined by measuring, after a predetermined time has elapsed, a subsequent correctly measurable applied pressure difference between the test side and the reference side and determining a time until the pressure difference is reached.

5. The method as recited in claim 3, wherein the first reference leak rate ($q_{Ref.}$) is calculated as follows:

$$q_{Ref.} = V_{Kontr.} \cdot \Delta p^{def}_{(H)} / \Delta t_{Prüf(H)}$$

where $\Delta t_{Prüf(H)}$ is the time until the predetermined pressure difference $\Delta p^{def}_{(H)}$ is reached, and $V_{Kontr.}$ is a reference volume in the control apparatus connected to the reference leak.

6. The method as recited in claim 4, wherein the first reference leak rate ($q_{Ref.}$) is calculated as follows:

$$q_{Ref.} = V_{Kontr.} \cdot \Delta p_{(H)} / \Delta t_{Prüf(h)}$$

where $\Delta t_{Prüf(H)}$ is the time until the pressure difference $\Delta p_{(H)}$ is reached, and $V_{Kontr.}$ is a reference volume in the control apparatus connected to the reference leak.

7. The method as recited in claim 1, wherein the influence of the system is determined by opening the connection between the test side and the system after the method step of determining the first reference leak rate and then determining the second reference leak rate.

8. The method as recited in claim 7, wherein the second reference leak rate is determined by measuring a time needed to reach a predetermined pressure difference between the system and the reference side.

9. The method as recited in claim 7, wherein the second reference leak rate is determined by measuring, after a predetermined time has elapsed, a subsequent correctly measurable applied pressure difference between the system and the reference side and determining a time until the pressure difference is reached.

10. The method as recited in claim 8, wherein the influence of the system ($\Delta p_{\Phi Syst.}$), which is a measure of the quotient of the volume and the total leak rate, is calculated as follows from the resulting time ($\Delta t_{Prüf(I)}$) for the pressure drop ($\Delta p_{(I)}$):

$$\Delta p_{\Phi Syst.} = (\Delta t_{Prüf(I)} / (V_{Kontr.} / q_{Ref2.} \cdot ((p^2_{abs(I)} - p^2_{amb}) / (p^2_{abs(H)} - p^2_{amb})))) - \Delta p^{def}_{(I)} \text{ or}$$

$$\Delta p_{\Phi Syst.} = (\Delta t_{Prüf(I)} / (V_{Kontr.} / q_{Ref2.} \cdot ((p^2_{abs(I)} - p^2_{amb}) / (p^2_{abs(H)} - p^2_{amb})))) - \Delta p_{(I)}.$$

where $q_{Ref2}$ is the second reference leak rate, $p_{amb}$ is ambient air pressure, $p_{abs(H)}$ is an absolute pressure of the test medium during measure of the first reference leak rate and $p_{abs(I)}$ is an absolute pressure of the test medium during measure of the second reference leak rate.

11. The method as recited in claim 7, wherein existence of a major leak is checked during the method step of determining the second reference leak rate.

12. The method as recited in claim 11, wherein the major leak exists when the time exceeds a predetermined value.

13. The method as recited in claim 1, wherein after filling the system and the control apparatus with a test gas a stabilization phase is implemented.

14. The method as recited in claim 13, wherein during the stabilization phase, an absolute pressure of the test medium during a time interval is measured.

15. The method as recited in claim 14, wherein during the stabilization phase, the absolute pressure of the test medium during the time interval must not exceed or fall below predetermined limit values.

16. The method as recited in claim 13, wherein during the stabilization phase a temperature of the test medium is measured.

17. The method as recited in claim 16, wherein during the stabilization phase, a change in temperature during the time interval does not exceed a predetermined value.

18. The method as recited in claim 17, wherein the predetermined value ($\Delta \theta_{zul}$) is calculated as follows:

$$\Delta \theta_{zul} = (((p_{abs/(G)} - ((\Delta p^{def} < / \phi_\theta) \cdot (\phi_\theta - 1))) \cdot (\theta_{N(G)} + 273.15) / p_{abs/(G)})) - (\theta_{N(G)} + 273.15),$$

where $p_{abs/(G)}$ is an absolute pressure of the test medium in the stabilization phase, $\theta_{N(G)}$ is the temperature of the test medium, $\Delta p^{def}_{21}$ is a predetermined pressure difference, and $\phi_\theta$ is the error factor of the temperature.

19. The method as recited in claim 17, wherein the time interval ($\Delta t^{def}_{(G)}$) is calculated as follows:

$$\Delta t^{def}_{(G)} = \Delta \theta / \Delta \theta_{zul} t^{def}_<,$$

where $\Delta \theta$ is the change in temperature, $\Delta \theta_{zul}$ is the predetermined value, and $t^{def}_<$ is the unit of time of the shortest measurement cycle.

20. The method as recited in claim 1, further comprising: determining an approximate volume.

21. The method as recited in claim 20, wherein for determination of the approximate volume, first the system and a defined part of the control apparatus are filled with a test medium and then a connection to a reference volume is opened, so that the test medium is able to expand into the reference volume.

22. The method as recited in claim 21, wherein the approximate volume ($V_{-Syst}$) of the system is calculated as follows:

$$V_{-Syst.} = V_{Kontr.} / ((p_{abs/(E)ST} / p_{abs/(E)E.}) - 1),$$

where $p_{abs/(E)ST.}$ is start the absolute pressure before the start of the measurement, $p_{abs/(E)E.}$ is the absolute pressure after the end of the measurement, and $V_{Kontr.}$ is the reference volume.

23. The method as recited in claim 20, further comprising: depending on the approximate volume of the system, determining whether a measurement leak is to be connected in parallel in addition to the reference leak.

24. The method as recited in claim 23, further comprising: after determining the second reference leak rate, determining a measurement leak rate of the measurement leak which is connected to the reference side.

25. The method as recited in claim 24, wherein the measurement leak rate is determined by measuring a time needed to reach a predetermined pressure difference between the test side and the reference side.

26. The method as recited in claim 24, wherein the measurement leak rate is determined by measuring, after a predetermined time has elapsed, a subsequent correctly measurable applied pressure difference between the test side and the reference side and determining a time until this pressure difference is reached.

27. The method as recited in claim 24, wherein the measurement leak rate ($q_{mess1}$) is calculated as follows:

$$q_{Mess1} = V_{Kontr.} \cdot \Delta p_{(K)} / \Delta t_{Prüf.(K)} - q_{Ref.} \cdot ((p^2_{abs/(K)} - p^2_{amb}) / (p^2_{abs(H)} - p^2_{amb}))).$$

where $\Delta t_{Prüf.(K)}$ is a time need to reach a pressure difference $\Delta p_{(K)}$, $q_{Ref.}$ is the first reference leak rate, $p_{amb}$ is ambient pressure, $p^2_{abs/(K)}$ is an absolute pressure during measure of the measured leak rate and $p^2_{abs(H)}$ is absolute pressure during measure of the first reference leak rate.

28. The method as recited in claim 20, wherein, after the method step of filling the system and the control apparatus and before the method step of determining the approximate volume, a stabilization phase is implemented.

29. The method as recited in claim 28, wherein during the stabilization phase an absolute pressure of the test medium during a time interval is measured.

30. The method as recited in claim 29, wherein during the stabilization phase the absolute pressure of the test medium does not exceed or fall below predetermined limit values during the time interval.

31. The method as recited in claim 29, wherein during the stabilization phase a temperature of the test medium is measured.

32. The method as recited in claim 31, wherein during the stabilization phase a change in the temperature does not exceed a predetermined value during a time interval.

33. The method as recited in claim 32, wherein the predetermined value ($\Delta\theta_{zul}$) is calculated as follows:

$$\Delta\theta_{zul} = (((p_{abs/(D)}) - ((\Delta p^{def}_< / \phi_\theta) \cdot (\phi_\theta - 1))) \cdot (\theta_{N(E)} + 2730.15)/p_{abs/(D)})) - (\theta_{N(D)} + 273.15).$$

where $p_{abs/(D)}$ is the absolute pressure of the test medium during the stabilization phase, $\phi_\theta$ is a temperature error factor, $\theta_{N(D)}$ is a temperature of the test medium during the stabilization phase and $\theta_{N(E)}$ is a temperature of the test medium when determining the approximate volume.

34. The method as recited in claim 32, wherein the time interval ($\Delta t^{def}_{(D)}$) is calculated as follows:

$$\Delta t^{def}_{(D)} = \Delta\theta / \Delta\theta_{zul} \cdot t^{def}_<.$$

35. The method as recited in claim 24, wherein, after the method step of filling the system for determining the approximate volume, volume leak rates ($q_{Pr1}$) and ($q_{Pr2}$) are calculated as follows:

$$q_{Pr1} = m_{R...} \cdot R \cdot T_{Sätt} / M_{R...} \cdot a$$

$$q_{Pr2} = q_{Pr1} \cdot \eta''_{R...} / \eta_N$$

where $m_{R...}$ is the leak rate, expressed as mass flow, R is the general gas constant, $T_{sätt}$ is the absolute temperature of the process medium at saturation pressure, $M_{R...}$ is the molar mass of the process medium, $\eta''_{R...}$ is the dynamic viscosity of the process medium, and $\eta_N$ is the dynamic viscosity of the test medium.

36. The method as recited in claim 35, wherein before determination of the reference leak a volume leak rate ($q_{Pr3}$) is calculated as follows:

$$q_{Pr3} = q_{Pr2} \cdot (p^2_{abs/(F)} - p^2_{amb}) / (p^2_{Sätt} - p^2_{amb}),$$

where $p_{abs/(F)}$ denotes the test pressure up to which the system has been filled during the method step of filling, $p_{\cdot amb}$ denotes the atmospheric pressure, and $p_{sätt}$ denotes the saturation pressure of the process medium at ambient temperature.

37. The method as recited in claim 24, wherein after the method step of determining the measurement leak, the volume of the system and the total leak rate of the system are determined in one method step.

38. The method as recited in claim 37, wherein the total leak rate is determined by measuring the time needed to reach a predetermined pressure difference between the system and the reference side.

39. The method as recited in claim 37, wherein the total leak rate is determined by measuring, after a predetermined time has elapsed, the next subsequent correctly measurable applied pressure difference between the system and the reference side and determining the time until this pressure difference is reached.

40. The method as recited in claim 37, wherein the volume ($V_{Syst.}$) of the system is calculated as follows:

$$V_{Syst.} = \Delta t_{(L)} / (\Delta p_{(L)} - \Delta p_{\Phi/S} \cdot \Delta t_{(L)}) \cdot (q_{Ref.} \cdot (p^2_{abs/(L)} - p^2_{amb}) / (p^2_{abs(H)} - p^2_{amb}) + q_{Mess1} \cdot (p^2_{abs/(L)} - p^2_{amb}) / (p^2_{abs(K)} - p^2_{amb})) - V_{Kontr.}$$

and the total leak rate $q_{Syst.}$ is obtained in the result as follows:

$$q_{Syst.} = ((V_{Syst.} + V_{Kontr.}) \cdot \Delta p_{(L)} / \Delta t_{Pr\ddot{u}f(L)} - (q_{Ref.} \cdot (p^2_{abs/(L)} - p^2_{amb}) / (p^2_{abs(H)} - p^2_{amb}) + q_{Mess1} \cdot (p^2_{abs/(L)} - p^2_{amb}) / (p^2_{abs(K)} - p^2_{amb})).$$

41. The method as recited in claim 1, further comprising:
determining whether there is a leak within the valve battery between a test side that is connectable to the system and a reference side that is connectable to at least one of: the reference leak and a measurement leak, a differential pressure sensor and a valve being situated between the test side and the reference side.

42. The method as recited in claim 41, wherein, for self-testing the connection to the system is sealed, the same pressure is applied to the test side and the reference side, the valve is closed and, after a predetermined time difference the pressure difference is measured via the differential pressure sensor.

43. The method as recited in claim 42, wherein the pressure difference is compared with a predetermined minimum pressure difference.

44. The method as recited in claim 1, wherein before the start of the actual test the self-leak rate of the control apparatus is determined.

45. The method as recited in claim 44, wherein the connection to the system is closed, a pressure is applied to the control apparatus and, after a predetermined time difference has elapsed, the absolute pressure and the temperature of the test medium in the control apparatus are measured over a time period that is to be calculated.

46. The method as recited in claim 45, wherein the predetermined time difference $\Delta t$ is determined as follows:

$$\Delta t = 1 s P a \cdot p^2_{abs/(Eig.)} / p_{amb}.$$

47. The method as recited in claim 45, wherein the time period to be calculated ($\Delta t^{def}_{Eig.}$) is determined as follows:

$$\Delta t^{def}_{Eig.} = \Delta p^{def}_{Eig.} \cdot V^{def}_{Eig.} / q^{lim}_{Eig.} \sqrt{T^{def}_{Eig.}} / (\theta_{N.ST} - 173.15) \cdot (p^2_{abs.ST} - p^2_{amb}) / (p^{2def}_{Eig.} - p^2_{amb}),$$

where $\Delta p^{def}_{Eig.}$ denotes a defined pressure difference in the self-measurement, $V^{def}_{Eig.}$ denotes the fixed volume in the self-test, $q^{lim}_{Eig.}$ denotes the maximum allowed leak rate, and $p^{def}_{Eig.}$ denotes the defined pressure in the self-test.

48. The method as recited in claim 45, wherein the actual pressure drop ($\Delta p_{Eig./t}$) after the time difference ($\Delta t^{def}_{Eig.}$) is determined as follows:

$$\Delta p_{Eig./t} = p_{abs.ST} \cdot (\theta_{N.Ist} + 273.15 / \theta_{N.ST}) - p_{abs.Ist.}$$

where $p_{abs.ST}$ denotes the absolute pressure at the start of the measurement, $\theta_{N.IST}$ denotes the temperature of the test medium after time difference $\Delta t^{def}_{Eig.}$, $\theta_{N.ST}$ denotes the temperature at the start of the measurement, and $p_{abs.Ist}$ denotes the absolute pressure after time difference $\Delta t^{def}_{Eig.}$.

49. The method as recited in claim 48, wherein by determining the actual pressure drop ($\Delta p_{Eig./t}$) after the time difference ($\frac{1}{10} \cdot \Delta t^{def}_{Eig.}$), the following comparison is used to ascertain whether there is a major leak, and there is a major leak if $$\Delta p_{Eig./1/10 \cdot t} > \frac{1}{2} (\Delta t^{def}_{Eig.} \cdot q^{lim}_{Eig.} \cdot V^{def}_{Eig.}),$$

and there is no major leak if $$\Delta p_{Eig./1/10 \cdot t} \leq \frac{1}{2} (\Delta t^{def}_{Eig.} \cdot q^{lim}_{Eig.} \cdot V^{def}_{Eig.}.$$

50. The method as recited in claim 44, wherein the self-leak rate ($q^{Prüf}_{Eig.}$) of the control apparatus is determined as follows:

$$q^{Prüf}_{Eig.} = V_{Eig.} \cdot (\Delta p_{Eig.} + (\theta_{N.Ist} + 273.35)/(\theta_{N.Ist} + 273.1) - p_{abs.Ist})/\Delta t_{Eig.}$$

51. The method as recited in claim 50, wherein the self-leak rate ($q^{Prüf}_{Eig.}$) of the control apparatus is compared with the maximum allowed self-leak rate ($q^{lim}_{Eig.}$).

52. The method as recited in claim 1, wherein nitrogen is used as the test medium.

53. The method as recited in claim 1, further comprising: emptying the system of test medium.

54. A control apparatus for determining a total leak rate of a system to which a pressure is applied, the control apparatus being connectable to the system, the control apparatus comprising:
a measuring unit; and
a valve battery which is controllable by the measuring unit, the valve battery having a test side and a reference side which are separated by a differential pressure sensor and a test-and-check valve connected in parallel thereto, wherein a reference leak of a test medium is provided on the valve battery, a first reference leak rate of the reference leak is determined, a connection between the system and the control apparatus is opened to determine a second reference leak rate of the reference leak according to influence by the system, and the total leak rate is determined using a difference between the first reference leak rate and the second reference leak rate.

55. The control apparatus as recited in claim 54, wherein the test side is connectable to the system to be checked.

56. The control apparatus as recited in claim 55, wherein the test side is connectable to the system via a system valve.

57. The control apparatus as recited in claim 54, further comprising:
a filling and emptying valve provided on the test side.

58. The control apparatus as recited in claim 57, further comprising:
a coupling for a pressure generator provided on the filling and emptying valve.

59. The control apparatus as recited in claim 54, further comprising:
a drain provided on the test side for draining out the test medium.

60. The control apparatus as recited in claim 59, wherein the drain is provided on the filling and emptying valve.

61. The control apparatus as recited in claim 54, wherein a temperature sensor is provided on the test side.

62. The control apparatus as recited in claim 54, further comprising:
an absolute pressure sensor provided on the test side between the differential pressure sensor and the test-and-check valve.

63. The control apparatus as recited in claim 54, wherein the test-and-check valve is a 3/3 valve.

64. The control apparatus as recited in claim 63, wherein the inlet of the 3/3 test-and-check valve faces toward the test side, while one of the outlets is connected to the side of the differential pressure sensor facing the reference side.

65. The control apparatus as recited in claim 64, wherein the second of the outlets is connected to a cutoff valve.

66. The control apparatus as recited in claim 65, wherein the cutoff valve is connected at the outlet end to a reference volume.

67. The control apparatus as recited in claim 65, wherein the cutoff valve is connected at the outlet to a reference leak valve or to a reference leak valve and a measurement leak valve.

68. The control apparatus as recited in claim 67, wherein the reference leak is provided downstream from the reference leak valve and a measurement leak is provided downstream from the measurement leak valve.

69. The control apparatus as recited in claim 68, wherein the reference leak and the measurement leak are capillary tube leaks.

70. The control apparatus as recited in claim 54, further comprising:
an absolute pressure sensor and a differential pressure sensor provided in the measuring unit.

71. The control apparatus as recited in claim 54, wherein the measuring unit has analyzer electronics.

* * * * *